(12) United States Patent
Menon et al.

(10) Patent No.: US 11,490,432 B1
(45) Date of Patent: Nov. 1, 2022

(54) UNIFIED QUERY TOOL FOR NETWORK FUNCTION VIRTUALIZATION ARCHITECTURE

(71) Applicant: T-Mobile USA, Inc., Bellevue, WA (US)

(72) Inventors: Nidhin Menon, Bothell, WA (US); Arnold Cataniag, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/334,625

(22) Filed: May 28, 2021

(51) Int. Cl.
*G06F 15/173* (2006.01)
*H04W 76/11* (2018.01)
*H04W 76/25* (2018.01)
*G06F 9/455* (2018.01)
*H04W 8/20* (2009.01)

(52) U.S. Cl.
CPC ......... *H04W 76/11* (2018.02); *G06F 9/45558* (2013.01); *H04W 8/20* (2013.01); *H04W 76/25* (2018.02); *G06F 2009/45595* (2013.01)

(58) Field of Classification Search
CPC ....... H04W 76/11; H04W 8/20; H04W 76/25; G06F 2009/45595; G06F 9/45558
See application file for complete search history.

(56) References Cited

U.S. PATENT DOCUMENTS

| | | |
|---|---|---|
| 5,359,646 A | 10/1994 | Johnson et al. |
| 5,822,520 A | 10/1998 | Parker |
| 5,954,829 A | 9/1999 | Mclain et al. |
| 6,618,389 B2 | 9/2003 | Hoefelmeyer et al. |
| 6,804,796 B2 | 10/2004 | Gustavsson et al. |

(Continued)

FOREIGN PATENT DOCUMENTS

| | | |
|---|---|---|
| CN | 106201854 B | 2/2019 |
| EP | 1305686 A2 | 5/2003 |

(Continued)

OTHER PUBLICATIONS

U.S. Appl. No. 17/334,615, filed May 28, 2021; titled Unified Interface and Tracing Tool for Network Function Virtualization Architecture.

(Continued)

*Primary Examiner* — John B Walsh
(74) *Attorney, Agent, or Firm* — Perkins Coie LLP

(57) ABSTRACT

A system instantiates a unified query tool for a telecommunications network including a Network Function Virtualization (NFV) architecture. The NFV architecture includes distributed Virtual Network Functions (VNFs), where each VNF has multiple instances of a virtual component function. The system receives a query including key information indicative of a subscriber or a session of the telecommunications network. The query is associated with a logic flow that traverses a first VNF and a second VNF. The system identifies a first virtual component function of the first VNF as a first anchor point for the subscriber or the session. The first anchor point is identified based on the key information. The method retrieves results data that satisfies the query from the first virtual component function. The results data indicates behavior of the first virtual component function relative to the subscriber or the session.

20 Claims, 8 Drawing Sheets

(56) References Cited

U.S. PATENT DOCUMENTS

| | | |
|---|---|---|
| 6,823,479 B1 | 11/2004 | Mcelhaney et al. |
| 7,171,464 B1 | 1/2007 | Raghuraman et al. |
| 7,278,061 B2 | 10/2007 | Smith |
| 7,284,234 B2 | 10/2007 | Steg et al. |
| 7,340,535 B1 | 3/2008 | Alam |
| 7,466,710 B1 | 12/2008 | Clemm et al. |
| 7,502,327 B2 | 3/2009 | Burns et al. |
| 7,512,933 B1 | 3/2009 | Tortosa et al. |
| 7,526,550 B2 | 4/2009 | Frey et al. |
| 7,606,893 B2 | 10/2009 | Petrov et al. |
| 9,602,338 B2 | 3/2017 | Zhang et al. |
| 9,755,934 B1 | 9/2017 | Shaham et al. |
| 10,936,477 B2 | 3/2021 | Fisher |
| 2002/0015387 A1 | 2/2002 | Houh |
| 2002/0016937 A1 | 2/2002 | Houh |
| 2006/0028999 A1 | 2/2006 | Iakobashvili et al. |
| 2007/0168486 A1 | 7/2007 | Mccoy et al. |
| 2007/0211696 A1 | 9/2007 | Noble |
| 2007/0211697 A1 | 9/2007 | Noble |
| 2009/0175177 A1 | 7/2009 | Schwann |
| 2009/0300423 A1 | 12/2009 | Ferris |
| 2011/0282642 A1 | 11/2011 | Kruger et al. |
| 2019/0199599 A1* | 6/2019 | Zavesky ............. H04L 41/0672 |
| 2019/0235998 A1 | 8/2019 | Fisher |
| 2019/0370162 A1 | 12/2019 | Mandal et al. |
| 2022/0043731 A1* | 2/2022 | Larson ................ G06F 11/3452 |
| 2022/0086218 A1* | 3/2022 | Sabella ................ H04W 12/06 |

FOREIGN PATENT DOCUMENTS

| | | |
|---|---|---|
| WO | 2004004217 A1 | 1/2004 |
| WO | 2012019317 A1 | 2/2012 |

OTHER PUBLICATIONS

U.S. Appl. No. 17/334,640, filed May 28, 2021; titled Product Validation Based on Simulated Enhanced Calling or Messaging Communications Services in Telecommunications Network.

* cited by examiner

UNIFIED QUERY TOOL FOR NETWORK FUNCTION VIRTUALIZATION ARCHITECTURE

BACKGROUND

Product development in the telecommunication industry follows rigorous standards to ensure stability, protocol adherence and quality, which results in reliable products and associated systems. While this model worked well in the past, it inevitably led to long product cycles, a slow pace of development, and reliance on proprietary or custom hardware. The rise of significant competition in communication services from fast-moving organizations operating at large scale on the Internet has spurred service providers to improve product development models.

A network function virtualization (NFV) model is a network architecture that virtualizes classes of network node functions into building blocks that may connect, or chain together, to create communication services. A virtual network function (VNF) is a software implementation of a network function that can include one or more virtual machines running different software and processes, on top of servers, switches and storage devices, or even a cloud computing infrastructure, instead of having custom hardware for each network function. For example, a virtual Session Border Controller (SBC) could be deployed to protect a network without the typical cost and complexity of obtaining and installing physical network protection units.

An NFV infrastructure is the totality of hardware and software components on which VNFs are deployed. The NFV infrastructure includes virtual and physical processing and storage resources, and virtualization software. A Network Function Virtualization Management and Orchestration (NFV-MANO) architecture includes the collection of all functional blocks, data repositories used by the blocks, and reference points and interfaces through which the functional blocks exchange information for the purpose of managing and orchestrating VNFs. The NFV-MANO includes management components and virtualization software operating on a hardware controller. The NFV also system has carrier-grade features to manage and monitor components, to recover from failures, and to provide security.

BRIEF DESCRIPTION OF THE DRAWINGS

Detailed descriptions of implementations of the present invention will be described and explained through the use of the accompanying drawings.

Figure 1:
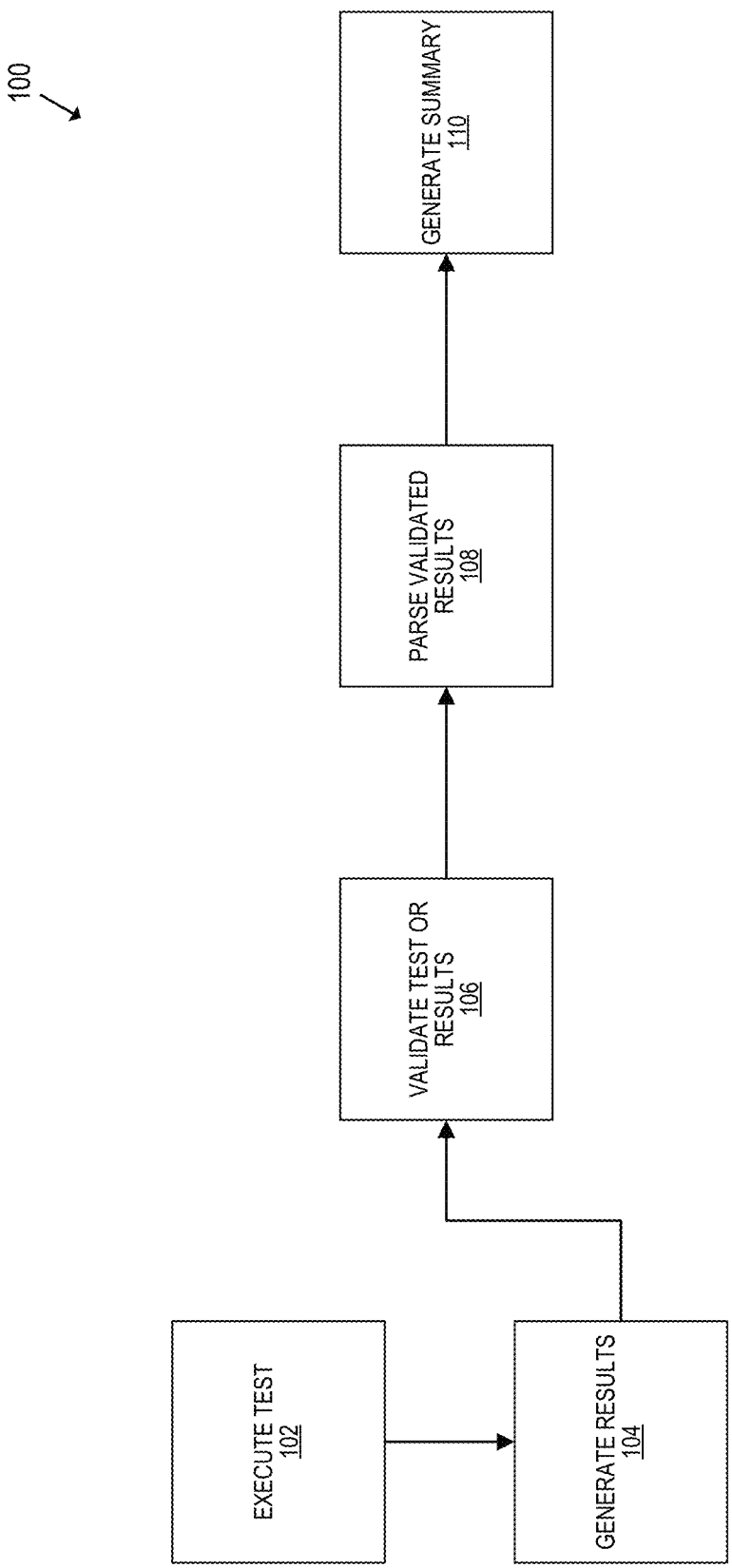
FIG. 1 is a flowchart that illustrates a process for testing a new product on a telecommunications network

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes testing tools such as a unified interface and tracing tool for distributed Virtual Network Functions (VNFs) in a telecommunications network. The unified interface and tracing tool improve over existing tools to detect an anomaly and identify the root cause of the anomaly at different levels of the network including the VNFs and their sub-functions (e.g., VNF1, VNF2, VNF3 instances). The tracing tool is accessible through the unified interface to trace internal logs, network logs, or debug logs for each VNF or sub-function. The tracing tool can capture log entries from each of the different types of logs at each VNF or sub-function. Hence, a user can use the unified interface to access each VNF or sub-function and find the root cause of an issue. The unified interface includes a unified query tool to receive and process a single query that is used to interrogate any or all VNFs or sub-functions simultaneously rather than require separate query entries.

The disclosed testing tools include software or hardware components configured to operate as part of a debugging framework that implements testing procedures. The testing tools can capture data indicative of performance parameters. A test procedure can monitor any number of different types of parameters, which vary depending on the configuration and settings of a test case. For example, networks employ various types of software components to deliver services like routing and switching, VoIP broadband access, and the like. The disclosed tools enable uniform probing and analysis of the virtual network components at a level of granularity not found in conventional testing tools. As such, for example, the disclosed testing tools enable identification of root causes of errors that can arise at different levels of a virtual architecture such as at separately instantiated sub-components (e.g., sub-functions) within virtual components.

Testing New Products

FIG. 1 is a flowchart that illustrates a process 100 for testing a new product (e.g., updated product, changed product) on a telecommunications network. At 102, a test case of a test suite is executed. In practice, a test case mimics a real-world scenario that a user can experience such as a voice call or a message chat. Based on the results of the test case, a test engineer can certify the product. The test case can include a test script that is configured to quantify performance of a new product (e.g., software or hardware device) on a telecommunications network. For example, the test script can define or call one or more logic flows (e.g., call flows) between two or more endpoint devices on the network, to test how software or hardware components of the network behave in response as the logic flows execute. An example of a logic flow includes a Voice over Long-Term Evolution (VoLTE)-to-VoLTE call. VoLTE is a high-speed wireless communication standard for mobile terminals, including Internet of things (IoT) devices and wearables, though the present system is not limited to voice communications+.

At 104, test data (e.g., results) are generated based on the executed test script. The test data can include values for one or more parameters associated with one or more network nodes. For example, in vehicle-to-vehicle (V2V) communications, there are about 26 logic flows related to the IP multimedia subsystem (IMS) core, and about 9 parameters per logic flow. The disclosed unified interface and tracing tool enables evaluating all 234 parameters concurrently. The parameters can include measurements that indicate performance of network node or related component involved in a test case. The parameters are set for the test script, which is configured for testing the new product. Examples of test data include the instances or frequency that the call drops off or performance parameters relative to a threshold quality of service (e.g., magnitude or frequency below the threshold). Likewise, the test can set parameters for hardware components such as user equipment (UE) that have different capabilities. The capabilities can be tested on different networks to address potential problems before large-scale deployment.

At 106, the test data are validated by comparing against expected data. For example, a test script can define parameters to validate the test itself, such as embedded errors. The parameters used to validate the test can aid to determine whether deviations in test data are attributed to a faulty test or are actual errors. The remaining parameters can set benchmarks for expected results from the network components and the product being tested. In one example, test data can include values of parameters configured for testing a specific product. The test data are compared against expected values for the VoLTE-to-VoLTE call to determine or infer errors based on the performance of the network.

At 108, validated test data are parsed to develop insights about anomalies, errors, or performance of the network. For example, test data that are associated with one component of the network can be separated from test data that are associated with another component of the network. The validated test data can be partitioned based on types of network components, their relative locations in the network, frequency of types of data, or any other measure that is useful to provide insights about the performance of the network relative to the new product being tested.

At 110, a summary of the test data is generated to provide insights about the performance of the network based on the test case. For example, the summary can include human-readable information indicative of whether any components of the network generated errors in response to the test case and the frequency or magnitude of those errors. The summary can be based on aggregate values or portions of the test data that enable a test engineer to determine the performance of the network in response to the product being tested.

Network Function Virtualization

Network Function Virtualization (NFV) is a network architecture concept of virtualization to virtualize entire classes of network node functions into building blocks that may connect to create communication services. The NFV architecture includes VNF nodes that are distributed as functional blocks of a network. Each VNF can include one or more virtual machines or containers running different software and processes (e.g., VNF1, VNF2, VNF3 sub-functions), on top of standard high-volume servers, switches and storage devices, or even cloud computing infrastructure, instead of having custom hardware appliances for each network function. As such, for example, a virtual Session Border Controller (SBC) could be deployed to protect a network without the typical cost and complexity of obtaining and installing physical network protection units.

In one example, functional blocks are components of a core network such as an IP multimedia subsystem (IMS) of a telecommunications network. That is, the IMS component nodes are implemented as VNFs in an NFV architecture. Examples of applications that can be virtualized as VNFs include a Telephony Application Server (TAS) and a Call Session Control Function (CSCF). Like many VNFs, a TAS has sub-functions including a virtual load balancer, session manager, and Diameter manager.

To build highly reliable and scalable services, the NFV architecture can instantiate VNFs, monitor them, repair them, and bill for rendered services. The NFV architecture enables dynamic scaling of resources to accommodate subscriber growth, redundancy, and unforeseen problems. These carrier-grade features are allocated to an orchestration layer of the architecture in order to provide high availability and security, and low operation and maintenance costs. The orchestration layer can manage VNFs irrespective of underlying technology. For example, the orchestration layer can manage a VNF for an SBC running on VMWARE VSPHERE just as well as a VNF of an IMS running on a kernel-based virtual machine (KVM). The disclosed technology addresses a significant gap in testing tools for NFV architectures due to each VNF having unique and independent functions.

Figure 2:
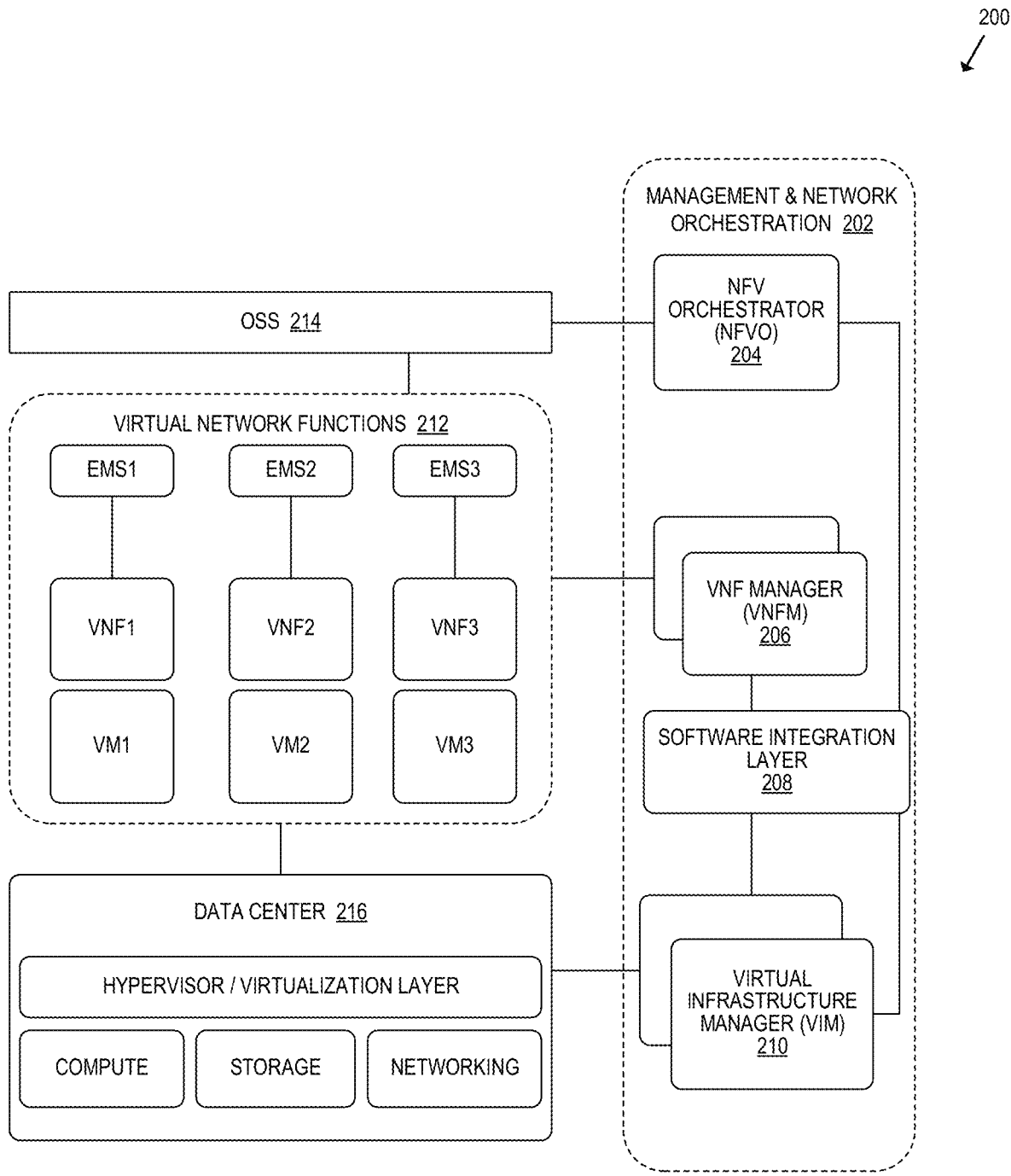
FIG. 2 is a block diagram that illustrates a Network Function Virtualization Management and Orchestration (NFV-MANO) architecture in which at least some test operations described herein can be implemented.

FIG. 2 is a block diagram that illustrates an NFV management and orchestration architectural framework (NFV-MANO) platform 200 in which aspects of the invention can operate. The NFV-MANO platform 200 can be built with a cloud native and web-scale architecture. The NFV-MANO platform 200 allows operators to control VNF assets while including NFV infrastructure features for traffic aggregation, load balancing and end-to-end (E2E) service assurance with analytics, monitoring, and orchestration.

A MANO portion 202 includes an NFV orchestrator (NFVO) 204 coupled to a VNF manager (VNFM) 206, a software integration layer 208, and a virtualized infrastructure manager (VIM) 210. The NFVO 204 coordinates the resources and networks needed to setup cloud-based services and applications. This process uses a variety of virtualization software and industry-standard hardware. The NFV defines standards for compute, storage, and networking resources that can be used to build the VNF 212. As illustrated, the VNF 212 has several instances of an element management system (EMS) on top of several instances of an VNF (VNF1, VNF2, VNF3) that resides on respective virtual machines (VMs). Here, the VNF1, VNF2, and VNF2 are sub-functions of VNF 212. An EMS is responsible for the FCAPS (fault, configuration, accounting, performance and security management) of the functional part of a VNF. The NFV-MANO platform 200 also includes an OSS 214 that includes a collection of systems/applications that a service provider uses to operate. The data center 216 includes a hypervisor/virtualization layer on top of a hardware networking infrastructure of compute, storage, and networking components.

The VNFM 206 works in concert with the other NFV-MANO functional blocks, the VIM 210 and the NFVO 204, to help standardize the functions of virtual networking and increase the interoperability of software-defined networking elements. These components, as standardized by ETSI, provide a standard framework for building NFV applications.

Functional Testing

Functional testing evaluates an NFV architecture to ensure that each VNF operates in conformance with specified requirements. In general, functionality is tested by feeding input and verifying the output to check what the VNF does. Each VNF is tested to verify that the output/result is as expected. The testing may involve checking APIs, database, security, user interface, client/server applications and other functionality of each VNF being tested. The internal structure, code, and performance are not considered in prior forms of functional testing. The purpose of functional testing is primarily to ensure usability, accessibility and requirement specs testing. It verifies that a new product will function properly and optimally on a network.

The disclosed technology enables concurrent testing of functional blocks and sub-functions to readily detect and anomaly (e.g., error) and identify a root cause. The sub-functions can be probed concurrently to generate test data stored in separate or unified files. As such, a test engineer can check test results across functional blocks and sub-functions at the same time to develop new insights. Moreover, the test data of the functional blocks and sub-functions are accessible through a unified interface coupled to the tracing tool despite operating using different protocols.

A packet probe employed by, or integrated into, the tracing tool can perform packet capture to enable inspection and debugging. As such, the tracing tool executes a test that enables inspection and debugging based on collected packet traffic. The debugging is based on test data such as parameter values for a test case, which can be defined by a test engineer as described earlier. The tracing tool can inspect the underlying functions of a VNF to identify the root source of performance issues. In contrast, existing packet analyzers such as Wireshark or Iris Session Analyzer (ISA) probe for packets only at a high-level such that the root cause of anomalies remains unknown. The existing packet analyzers cannot pinpoint the root cause of an anomaly in an NFV architecture in part because of the numerous functional blocks with sub-functions that dynamically instantiate independently.

The disclosed technology can probe sub-functions to identify a root cause. The collected packets of each sub-function are stored in a separate file or a unified file that provides human-readable information that can be presented to a user through the unified interface. Thus, the disclosed technology mitigates the operational inefficiencies of using separate interfaces or instances thereof to view test data of VNF sequentially.

The unified interface and tracing tool are also configured to automate testing across multiple virtual functions and include a unified query mechanism for receiving and processing a single query across any number of the functions. As such, a user can input one query on the unified interface, which applies the query concurrently to one or more functional blocks or sub-functions of an NFV architecture. As such, multiple or all the separate functions are concurrently interrogated rather than requiring individual queries for each separate functional block or sub-function.

Figure 3:
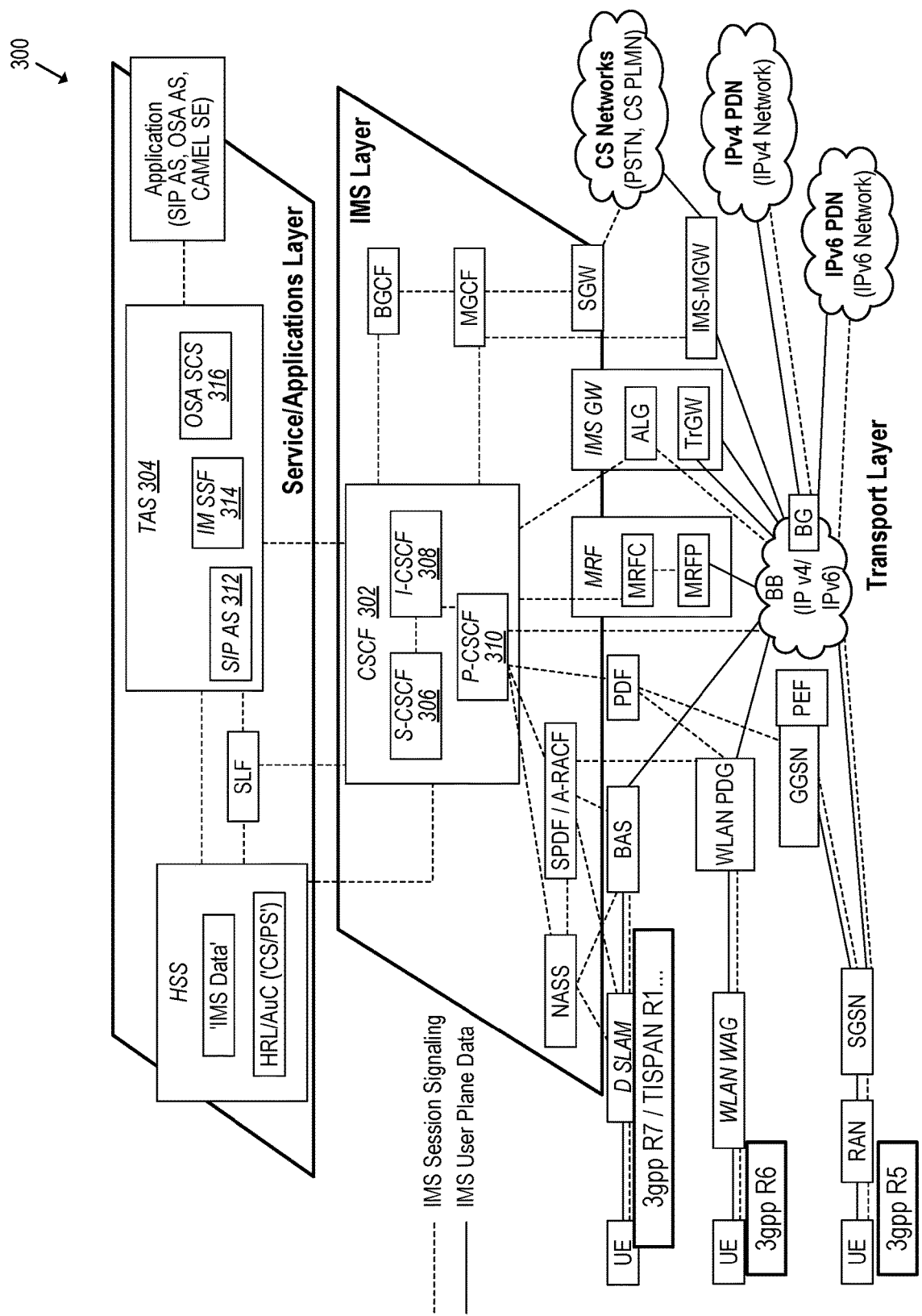
FIG. 3 is a block diagram that illustrates an IP multimedia subsystem (IMS) architecture in which at least some test operations described herein are implemented.

FIG. 3 is a block diagram that illustrates an IMS architecture 300 in which at least some test operations described herein are implemented. The IMS architecture 300 is designed to enable network operators to provide a wide range of real-time, packet-based services and to track their use in a way that allows both traditional time-based charging as well as packet and service-based charging. As shown, the IMS architecture 300 includes a distributed network of functional blocks that each represent, for example, an application function. An example of a functional block is a VNF that can include smaller blocks representing sub-functions (e.g., micro-services) or other logical functions.

The IMS provides a wide range of SBC, including call access control, reachability, and security. The IMS has a framework for deployment of both basic calling services and enhanced services, including multimedia messaging, web integration, presence-based services, and push-to-talk. The IMS also draws on the traditional telecommunications experience of guaranteed Quality of Service (QoS), flexible charging mechanisms (e.g., time-based, call-collect, premium rates), and lawful intercept compliance.

The IMS architecture 300 defines many common components (e.g., call control and configuration storage) such that that less development work is required to create a new service as the existing infrastructure can be reused. The use of standardized interfaces increase competition between suppliers thereby preventing operators from being locked into a single supplier's proprietary interfaces. As a result, the IMS enables new services to be rolled out quickly and inexpensively, compared with the traditional monolithic design of telephony services.

The illustrated blocks (large and small) represent logical components that are associated with underlying hardware. To debug any of the logical components, the packet probe taps into a component to capture logs of the component and/or its different sub-components. In one example, the larger functional blocks represent logical virtual nodes (LVN) that include one or more sub-functions (e.g., micro-services). Examples include compute, OSS, VSS systems, and lifecycle managers. As shown, communications of the IMS architecture 300 include IMS session signaling (dashed line) and user plane data (solid line). In the illustrated example, the communications include packet traffic that is generated as part of logic flows during test cases, which can be probed to detect an anomaly and identify the source of the anomaly. The logic flows can represent operations such as a file transfer, text chat, or other forms of communications of different protocols.

As shown, the communications of the logic flows traverse a Call Session Control Function (CSCF) 302 and a Telephony Application Server (TAS) 304. The CSCF 302 provides the central control function in the IMS core to setup, establish, modify, and tear down multimedia sessions. The CSCF 302 is distributed across three types of sub-functional elements based on the specialized function that they perform. Specifically, the CSCF 302 is an example of a functional block with sub-functions including the Serving-CSCF (S-CSCF) 306, Interrogating-CSCF (I-CSCF) 308, and Proxy-CSCF (P-CSCF) 310 that are connected to other functional blocks and sub-functions.

The TAS 304 supports multiple application servers for telephony services, includes a back-to-back SIP user agent that maintains the call state, and contains service logic which provides the basic call processing services such as digit analysis, routing, call setup, call waiting, call forwarding, conferencing, and the like. The TAS 304 is another example of a functional block that has sub-functions including the Session Initiation Protocol Application Server (SIP-AS) 312, IMS Switching Function (IMS-SSF) 314, and Open Service Access Service Capability Server (OSA-SCS) 316 that are connected to other functional blocks and sub-functions.

The CSCF 302 and TAS 304 are examples of VNFs that can be tested against a new product as part of one or more logic flow(s) that interact with multiple nodes of the IMS architecture 300. In one example, a test case defines parameters for analyzing the performance of VNFs such as the CSCF 302, the TAS 304, and their respective sub-functions. In one example, a new device (e.g., UE with updated software) is tested to validate on the IMS architecture 300. A test process can include one or more separate test scripts that each invoke a logic flow and packet probe to analyze test data that is used to collectively validate performance of the new product relative to the IMS architecture 300.

A computer system communicatively couples to the IMS and runs one or more test cases to test a new product. The test cases include different test scripts to execute logic flows and measure certain parameters of the IMS, compare expected parameter values against measured values, and generate performance results for the IMS and/or new product based on the differences. A packet probe is used to capture packets of the IMS while the test is being conducted. Specifically, the test cases are configured such that the packet probe is used to analyze performance based on numerous parameters associated with functional blocks and sub-functions and measure corresponding values. The collective test data indicates how nodes of the IMS architecture 300 react to the new product based on the logic flows of test cases. As such, a test engineer can detect an issue in the IMS relative to a logic flow for the new product.

The issue can include an anomaly such as an error that is detected based on captured and analyzed packets. Examples of issues include call drops, call quality issues, or reductions in Key Performance Indicators (KPIs). To debug an issue, the packet probe can identify the root cause of the issue by performing packet capture at different levels of the NFV architecture including the VNFs (e.g., based on session signaling, user plane data) and sub-functions (e.g., micro-services data). As such, the packet probe offers visibility into VNFs to pinpoint a sub-function as a root cause, which is necessary to resolve the issue.

The unified interface and tracing tool can operate on functional blocks and sub-functions concurrently to identify a root cause of an issue. In one example, the unified interface includes a user interface (UI) that enables interactions between users and an NFV architecture. The interactions allow users to manage and control test cases from the user-end, whilst the NFV architecture simultaneously feeds back information that aids in decision-making. Other implementations of the unified interface include a graphical UI (GUI), command line interface, or backend interface. Thus, a user can input parameters for test cases through the unified interface and view test data.

The unified interface allows for broad and uniform access across functional blocks and sub-functions associated with underlying compute and storage components. In operation, the sub-functions communicate with each other in a manner that is not plainly detectable by conventional interfaces outside of each functional block. In contrast, the disclosed unified interface enables interactions with a packet probe having tracing capabilities across functional blocks and sub-functions through a network orchestrator.

As a result, the disclosed technology enables lower-level analysis of sub-functions within functional blocks to provide new insights into performance issues. For example, consider a functional block that has N micro-functions. The packet probe can collect packets communicated among the N micro-functions to analyze N sets of packets collectively (or separately) and debug errors. This form of debugging requires fewer sessions for packet probes to check different micro-functions thereby obviating the need to a packet probe in multiple sessions sequentially to investigate each sub-function as a potential root cause of error. As such, a test engineer can readily resolve identified errors.

In one example, a debug process has two packet-capturing logs that record test data of logic flows traced from VNF1 to VNF2 to VNF3. The tracing tool is coupled to the unified interface and has capabilities to probe and communicate with each functional block. A packet capture file is generated based on packets captured by the packet probe, and the unified interface enables access to the packet capture file. Thus, the tracing functionality is enhanced with a unified interface that is common across the sub-functions of functional blocks. As such, the tracing tool can capture packets from across numerous functional blocks and sub-functions and generate a single packet capture file that reflects a snapshot of packets captured from across those functions. The test data is presented at the unified interface, which improves the operational efficiency for debugging.

Another aspect of the disclosed technologies includes a representational state transfer application program interface (RESTful API) based UI automation logic for VoLTE and Rich Communication Services (RCS) communications. RESTful is an architectural style for an API that uses HTTP requests to access and use data. That data can be used to GET, PUT, POST and DELETE data types, which refers to the reading, updating, creating and deleting of operations concerning resources. Compared to VoLTE, which is a high-speed wireless communication standard for mobile phones and data terminals, RCS is a communication protocol between mobile carriers and between mobile phone and carrier, aiming at replacing SMS messages with a text-message system that is richer, provides phonebook polling (for service discovery) and can transmit in-call multimedia. Examples include chat messaging and file transfers.

The disclosed technology includes automation logic for E2E packet flow validation and UI flow validation, which advantageously includes the last phase of testing a new product on an IMS. The tracing tool can automate functional testing by simulating, for example, VoLTE-to-VoLTE communications between HPLMN and multiple foreign and domestic VPLMNs. The validation involves automating a confirmation of a VoLTE call on both sending and receiving devices. For example, consider a VoLTE call to a foreign VPLMN. A test operator typically makes a call manually and observes call behavior including, for example, latency before connection and during the call. The disclosed technology sets-up baseline expectations and automates calls compared against baseline expectations to detect anomalies. In addition, the tracing tool performs functional regression that simulates VoLTE and RCS communications to improve the last phase of testing a new product. The simulation can involve simulating real-time text messages and real-time RCS services (e.g., WhatsApp chat).

The automation logic implements test scripts that simulate logic flows (e.g., call flows). Examples of logic flows include LTE/IMS registration, Wi-Fi/Wi-Fi calling, VoLTE-to-VoLTE calling, RTT-to-RTT calling, VoLTE-to-VoWiFi calling, Call Forward Unconditional, Single Radio Voice Call Continuity (SRVCC), and RCS one-to-one chat.

Figure 4:
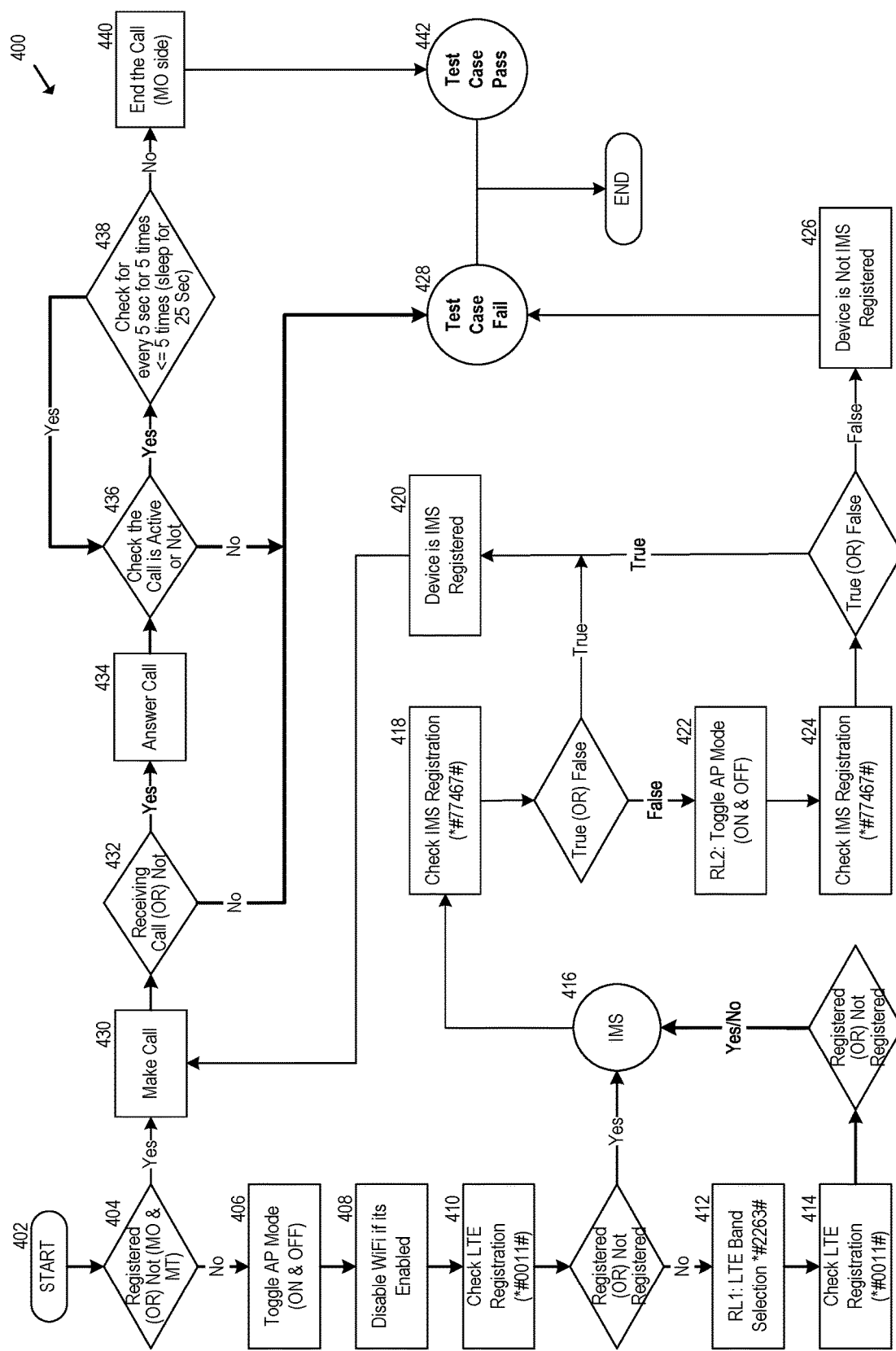
FIG. 4 is a flowchart that illustrates an example of a logic flow including a Voice over Long-Term Evolution (VoLTE)-to-VoLTE call configured to verify a new product.

FIG. 4 is a flowchart that illustrates an example of a logic flow including a VoLTE-to-VoLTE call configured to verify a new product on an IMS. A test case can verify parameters for VoLTE Mobile Origination (MO) or VoLTE Mobile Termination (MT) procedures. The associated test scripts define one or more preconditions including, for example, a number of VoLTE devices hosted in a testing environment, VoLTE users being LTE/IMS registered, a test server connecting the testing environment to a cloud system, and configuration file(s) that are available and up-to-date. The illustrated VoLTE-to-VoLTE call is simulated in a robot framework for REST API automation.

At 402, the system runs a test suite to perform the VoLTE-to-VoLTE call. A test suite setup can include provisioning VNFs such as SBG, CSCF, and TAS, and performing health check procedures to ensure that associated devices are in good condition and/or registered with the IMS registered. The system can also initiate a packet probe tool to perform packet capture and analysis.

At 404, a check is performed to determine whether MO and MT devices have registered successfully with the IMS. In one example, a dialer is opened for User-A (VoLTE-A) and User-B (VoLTE-B) and dials * #77467 #. If IMS registration is successful for both Users A and B, the VoLTE-to-VoLTE call is made at 430, as discussed further below. If IMS registration is not successful for either Users A and B, a recovery procedure is performed. For example, at 406, a dialer opens for Users A and B and performs airplane (AP) mode toggling and WiFi is disabled at 408.

At 410, a check is performed to determine a status of LTE registration. The dialer for User-A device is open and dials * #0011 #. If LTE registration is successful, IMS registration is performed at 416. If LTE registration is unsuccessful, another recovery procedure is performed. For example, at 412, an LTE band selection operation is performed by opening a dialer for User-A, dialing * #2263 #, and selecting a suitable LTE band.

At 414, a check is performed to determine whether LTE registration was successful. Specifically, a dialer is opened for User-A device and * #0011# is dialed. At 416, IMS registration is performed by opening the dialer for User-A device and dialing * #77467 #. At 418, a check is performed to determine whether IMS registration was successful. If IMS registration was successful, the system declares that the associated user device is registered with the IMS at 420. If IMS registration was not successful, another recovery procedure is performed by toggling the AP mode at 422 and checks to determine whether IMS registration was successful at 424. If IMS registration remains unsuccessful, the system declares that the user device is not IMS registered at 426, determines that the test case failed at 428, and terminates the automated procedure 400.

Referring back to 430, when IMS registration is successful for both Users A and B, the VoLTE-to-VoLTE call is made by opening the dialer for User-A and dialing the device-B number to make call. At 432, the system determines whether the call is received at device-B by User-B. If the call is not received, the test case failed at 428, and the process terminates. If the call is received, the call is answered at 434. At 436, a procedure for a conversation continues for 30-60 seconds. At 438, the system checks every 5 seconds whether the call is active or not for both User-A and User-B. At 440, the call terminates after a 30-60 second call duration. After terminating the call, the test case closes, and devices A and B are released. After releasing the devices, the packet capture process stops and filters are applied to captured packets. The automation run in the test environment terminates.

At 442, the automation framework determines whether the VoLTE-to-VoLTE call passed or failed the test case based on pass/fail criteria set at the unified interface. The system accesses automation run results obtained via the packet probe to verify the E2E flow. In one example, the unified interface can obtain and present a report link to view all the REST API operations performed for or at the devices and associated test results.

Unified Interface and Tracing Tool

The tracing tool enables simultaneous packet probing of multiple functions selected for a logic flow, and the resulting test data is viewable through the unified interface. In one example, the tracing tool is a computer program or computer hardware such as a packet capture appliance that can intercept and log traffic that routes through the network or part of the network. The test data is generated in response to a test case executed on the network. The packets of the test data route through the network, and the tracing tool captures the packets. If needed, the tracing tool parses packets to extract parameter values (e.g., fields values), and analyzes the content relative to specifications to generate test results that are presented on the unified interface.

The tracing tool can trace different types of logs for different network nodes. In one example, the tracing tool generates the logs. In another example, the tracing tool can probe existing logs that are generated independent of the tracing tool. For example, the tracing tool can generate or analyze internal logs, network logs, or debug logs of multiple application nodes of the network. An internal log can include data about parameters related to network components such as indications that a component failed to connect a call for a logic flow. A network log can include information about parameters related to events that occurred in an application. For example, it can contain data related to calls to objects and attempts at authentication. A debug log can include information about parameters related to errors, warnings, or informational activity.

The tracing tool can perform a network trace that includes an entire communication path between devices over the network in accordance with a test case. The tracing tool can ingest, process, and index test data, which is searchable through the unified interface. These operations, and many in-between, generate data that can be recorded in the logs. The tracing tool can capture packets in real-time from logs of each functional block or sub-function. The tracing tool captures packets and can display them in human-readable format on the unified interface. The tracing tool can analyze log data of multiple application nodes and sub-components (e.g., functional blocks and sub-functions). In another example, the components generate logs independently, which serve as records of activity on the network during a test case, and the tracing tool taps into the logs to extract data for the unified interface.

The unified interface can include filters, color-coding, and other features that let a test engineer perform low level analysis of network traffic and inspect individual packets of different functional blocks and sub-functions. When an issue is logged for an endpoint device, the test engineer can use the unified interface to debug the issue by simultaneously logging into each functional block or sub-functions and find the root cause of the issue.

In one example, a test case includes a VoLTE-to-VoLTE call with one or more logic flows on a network as illustrated in FIG. 4. The tracing tool can inspect packets on the network to debug or verify the performance of the network components in response to the test case. Normally, the scope of a test can include numerous and different parameters associated with the logic flow. The type and number of parameters can vary depending on the particular test. The tracing tool can thus provide insights into detecting an issue, and then identifying the root cause or source of the issue. That is, the tracing tool can pinpoint a problem that, for example, caused the test case to fail. In contrast, existing tools cannot pinpoint the source of an anomaly or error among numerous functions and sub-functions of an NFV architecture. As such, a test engineer can obtain a high-level overview of network performance by running a test case including a call that routes through various functional blocks and sub-functions. Rather than needing different interfaces or separate tracing tools to view test data for each component separately, the disclosed unified interface and tracing tool improves operational efficiency to automate generating valuable insights.

Figure 5:
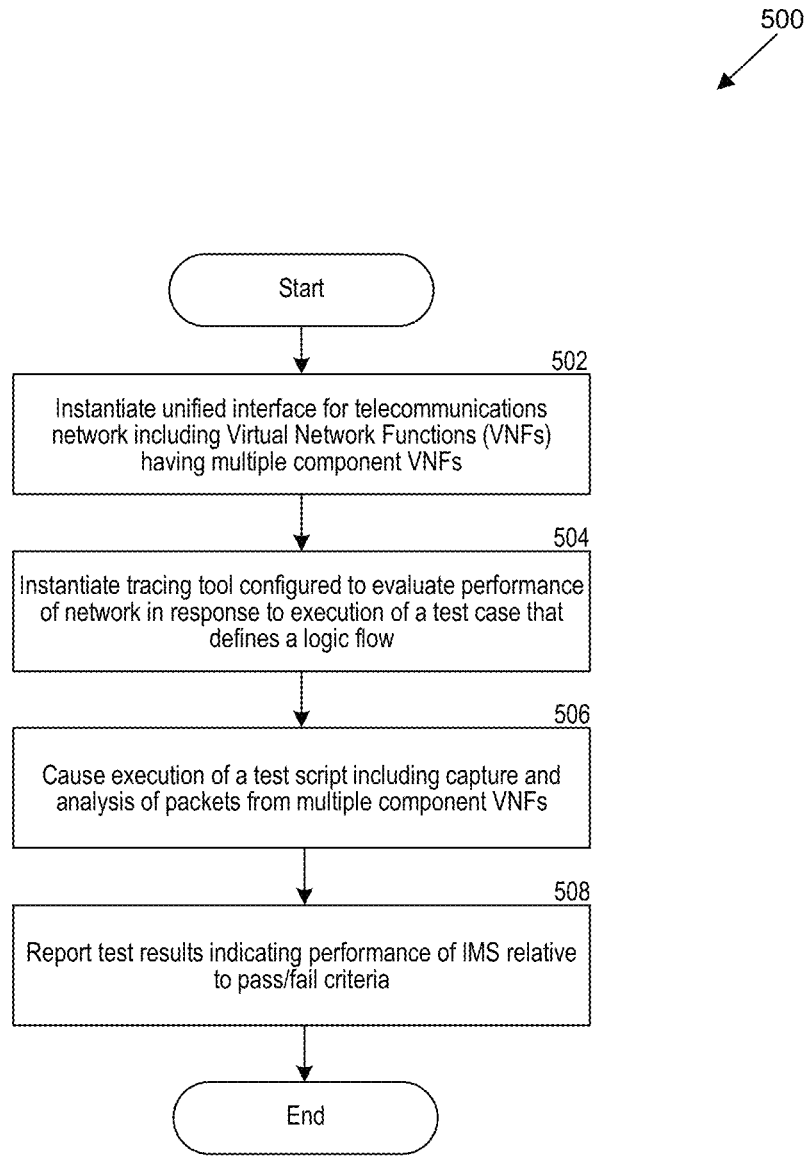
FIG. 5 is a flowchart that illustrates a process of a unified interface and tracing tool for testing a new product on a virtual distributed network.

FIG. 5 is a flowchart that illustrates a process 500 of a unified interface and tracing tool for testing a new product on a virtual distributed network. The process 500 is performed by a system communicatively coupled to a telecommunications network. In one example, the new product is a wireless device with a changed configuration, and a test case is configured to test performance of an IMS relative to the wireless device with a prior configuration. In another example, the new product is a new software product, and a test case is configured to test the performance of the IMS running the new software product.

At 502, the system instantiates a unified interface for a telecommunications network including an NFV architecture. The unified interface can include a graphical user interface (GUI), a command line interface, or a backend interface. The unified interface is coupled to an IMS of the telecommunications network including multiple VNFs (e.g., CSCF, TAS), where each VNF includes multiple component VNFs.

At 504, the system instantiates a tracing tool configured to evaluate performance of the IMS in response to execution of a test case. The test case includes a test script configured to test the new product on the IMS in accordance with a logic flow. The performance of the IMS is based on packets captured concurrently from two or more component VNFs. The tracing tool is accessible by a user through the unified interface.

The logic flow can define a path on the network including multiple virtual functions, where the path originates at a wireless device corresponding to the new product and terminates at another wireless device. The logic flow can include LTE/IMS registration, Wi-Fi/Wi-Fi calling, VoLTE-to-VoLTE calling, RTT-to-RTT calling, VoLTE-to-VoWiFi calling, Call Forward Unconditional procedure, Single Radio Voice Call Continuity (SRVCC) procedure, or an RCS communication.

In one example, the tracing tool includes a packet probe configured to cause the system to simultaneously probe the multiple component VNFs for the one or more parameters in packets. The system extracts field values of the parameters included in the packets and determines the performance of the IMS based on whether the field values satisfy the pass/fail criteria. The packets can have different communications protocols including any of Session Initiation Protocol (SIP), Domain Name Service (DNS) protocol, Diameter protocol, Signaling System 7 (SS7) protocol, or Hypertext Transfer Protocol (HTTP).

At 506, the system causes execution of the test script including capture and analysis of packets from the two or more component VNFs. The test case includes pass/fail criteria for one or more parameters extracted from packets of the two or more component VNFs. The pass/fail criteria can be input to the unified interface.

In one example, the system parses packets to extract values for the parameters, and then generates the test results based on a comparison of the extracted values with expected values for the parameters. The test results indicate a root cause of an error as one of the two or more component VNFs. In another example, the system traces log data of a VNF indicative of the performance of the IMS. In one example, the log data includes data related to network components, events that occurred in a network application, and errors or warnings.

At 508, in response to completing the test case, the system reports test results indicating the performance of the IMS relative to the pass/fail criteria. For example, the system can detect activity data of a virtual node based on values of the one or more parameters and then identify, based on the activity data, a virtual component of the virtual node as a root cause of an anomaly. The test results are presented through the unified interface. In one example, the system generates a common file including the test data of the two or more component VNFs, where the common file is accessible via the unified interface. In another example, the system detects anomalous activity of the IMS based on the test results and identifies a component VNF of the CSCF or the TAS as a root cause of the anomalous activity.

Unified Query Tool

The disclosed technology includes a unified query tool that is accessible by a user through the unified interface. The unified query tool enables querying for subscriber information associated with one or more anchor points (e.g., connection points) on a telecommunications network. For example, a VNF (e.g., VNF 212) has several virtual components (e.g., VNF1, VNF2, VNF3). A call of the subscriber's wireless device on the network has one and only one virtual component per VNF designated as an anchor point for the subscriber.

The unified query tool can identify a subscriber's anchor point(s) to retrieve subscriber-specific information. As such, the unified interface can be used to debug a call path to identify a faulty virtual component as the root cause of issues specifically experienced by the subscriber. In one example, the unified query tool receives a subscriber identifier such as a phone number as an input to identify the anchor point and check how a virtual component is behaving relative to the subscriber. The content of the query can map the subscriber identifier to key information including a subscriber ID and session ID, which maps to matching anchor point(s).

The unified query tool can use the key information to search any number of the functional blocks for sub-functions of a logic flow for anchor point(s). Specifically, the unified interface can replicate a single query across multiple functional components to simultaneously interrogate for subscriber information. The unified query tool enables searching different parameter types across the different functional blocks or sub-functions to efficiently troubleshoot a subscriber's experience on the network.

To find parameter data in logs, the unified interface can match a parameter identifier in log data. With the parameter identifier, a test engineer can analyze logs of functions for subscriber information through the unified interface. In one example, the tracing tool can capture log entries of each of three logs at each application node. If an anomaly is logged, then the unified query tool can be used to debug the anomaly by querying each application node to pinpoint the root cause of the anomaly.

Figure 6:
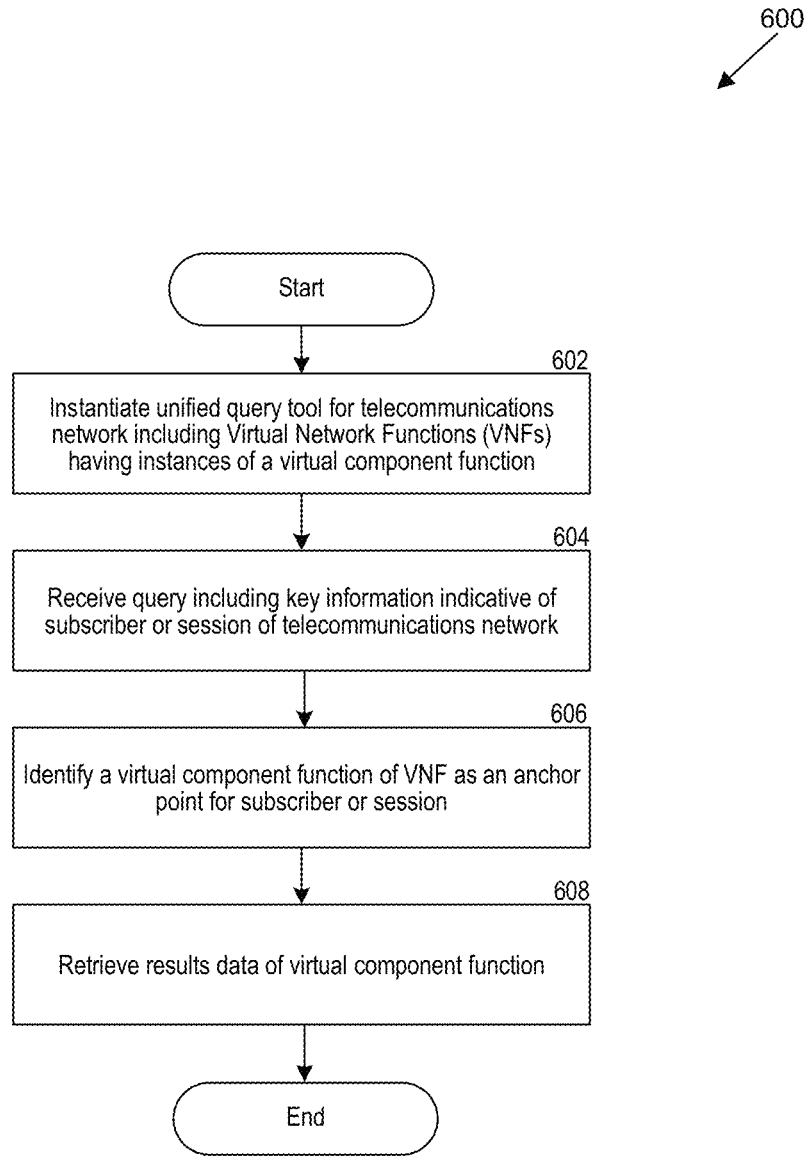
FIG. 6 is a flowchart that illustrates a process of a unified query tool for querying a virtual network for subscriber information.

FIG. 6 is a flowchart that illustrates a process 600 of a unified query tool for querying a virtual network for subscriber information. The process 600 is performed by a system communicatively coupled to a telecommunications network.

At 602, the system instantiates a unified query tool for a telecommunications network including an NFV architecture, which includes distributed VNFs having multiple instances of a virtual component function (e.g., multiple component VNFs). In one example, the first VNF includes a CSCF and the second VNF includes a TAS of an IMS.

At 604, the system receives a query including key information indicative of a subscriber or a session on the telecommunications network. In one example, the system instantiates the unified interface enabling access by the unified query tool to the distributed VNFs, where the unified interface is configured to receive the query as user input and output the results data in response to the query.

The key information includes an identifier of a wireless device associated with the subscriber or the session. The query is associated with a logic flow that traverses a first VNF and a second VNF. In one example, the logic flow models an LTE/IMS registration, Wi-Fi/Wi-Fi calling, VoLTE-to-VoLTE calling, RTT-to-RTT calling, VoLTE-to-VoWiFi calling, Call Forward Unconditional procedure, SRVCC procedure, or an RCS communication.

At 606, the system identifies a first virtual component function of the first VNF as a first anchor point for the subscriber or the session. The first anchor point is identified based on the key information. In one example, the system can simultaneously send copies of the query to multiple VNFs. As such, the query is sent to each of the sequence of the virtual network functions to identify a virtual component function based on matching the key information with data associated with the particular virtual component function.

There is usually only one anchor point per VNF. For example, the logic flow can traverse a third VNF and, as such, the system identifies a second virtual component function of the second VNF as a second anchor point and a third virtual component function of the third VNF as a third virtual function. The second anchor point and the third anchor point are identified based on the key information.

At 608, the system retrieves results data of the first virtual component function. The results data satisfies the query and indicates behavior of the first virtual component function relative to the subscriber or the session. In one example, the system generates a common file including the results data obtained from the multiple VNFs and causes the unified interface to access the common file and present the results data.

In one example, the system captures packets generated by the first virtual component and a second virtual component of the second VNF. The system generates the results data based on a comparison of actual parameter data extracted from the captured packets with expected parameter data. The captured packets can have different protocols including any of SIP, DNS, Diameter, SS7, or HTTP. The system can generate the results data based on a comparison of actual parameter data extracted from the captured packets with expected parameter data.

In another example, the system identifies a second virtual component function of the second VNF as a second anchor point for the subscriber or the session. The second anchor point is identified based on the key information and the system retrieves results data of the second virtual component function that also satisfies the query. The results data indicates behavior of the second virtual component function relative to the subscriber or the session.

The logic flow can model a test case on the telecommunications network for a new product. As such, the system can generate test data indicative of whether the first virtual component causes an issue for the new product. In another example, the system can capture packets generated by the first virtual component and parse the packets to extract field values, where the results data includes the extracted field values. In another example, the system can query log data of the first virtual component for data regarding a state of a network component, an event that occurred at a network application, or an indication of an error or warning. In another example, the system can retrieve, from the first virtual component, test data indicative of whether the first virtual component passed the test case. In one example, the new product is a wireless device with a changed configuration and the test case is configured to test whether the first virtual component caused an issue for the wireless device with the changed configuration. In another example, the system can retrieve, from the first virtual component, test data indicative of whether the first virtual component passed the test case. In another example, the new product is a software program and the test case tests the telecommunications network running the software program.

Simulated Enhanced Calling or Messaging Communications Services

The disclosed technology includes an automation engine that automates tests for different types of services such as VoLTE and RCS communications. In one example, components between endpoint devices and that support the service are validated, such as the RCS servers at each endpoint and a chat service itself. In another test case, the endpoint devices are also validated. The automation engine simulates services to validate the functionality of those services. The simulations can enable validating network flows or user equipment (UE).

The automation engine simulates VoLTE and RCS services to improve testing procedures. When a network product (e.g., device) is developed or changed (e.g., updated configuration), phases of testing include functional testing as describe earlier and regression testing that focuses on determining how changes in a product affect the performance of the network components. In regression testing, a partial or full selection of tests that have been already executed are run again. Successful regression testing ensures that the new product still works after changes were made, whereas successful functional testing ensures usability, accessibility, and requirement testing.

As such, the disclosed technology automates the validation for testing in E2E packet flow of RCS service testing or VoLTE service. In one example, a RESTful API (representational state transfer application program interface) based E2E IMS packet flow validation procedure including packet parsing and automation logic for VoLTE and RCS services. E2E communications occur between interfaces of each node of a network. For example, packets of a first protocol are exchanged between two nodes and counterpart packets between other nodes are of a second protocol different from the first protocol. A test case can designate different classes of packets such as mandatory and conditional parameters. The mandatory parameters can be required to pass a test whereas the conditional parameters are optional. The validation can include evaluating protocol-specific values for different protocols used by network nodes to communicate with each other.

For example, consider a VoLTE call to a foreign VPLMN (Visited Public Land Mobile Network). A test operator typically makes a call manually and observes call behavior including, for example, latency for the connection and call duration. Instead, the disclosed technology automates RCS or VoLTE service testing in an E2E packet flow. For example, baseline expectations are set based on manual observation. The technology then simulates VoLTE-to-VoLTE communications between HPLMN and multiple foreign and domestic VPLMNs. The simulation can include real-time text messages and real-time RCS services (e.g., WhatsApp chat). The results data are compared against baseline expectations for features such as call duration. The validation involves automating a confirmation of a VoLTE call duration on both the sending and receiving devices.

Figure 7:
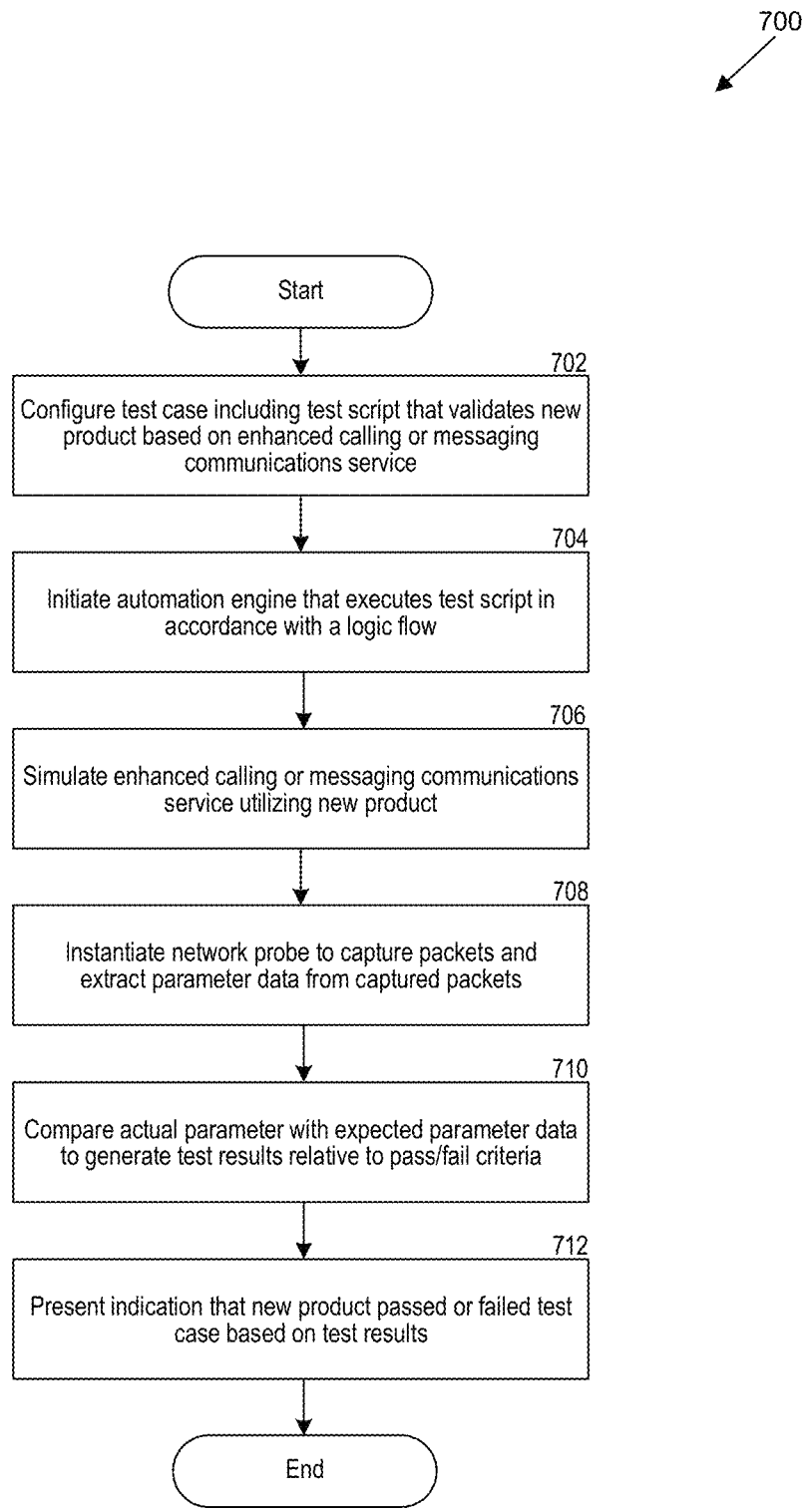
FIG. 7 is a flowchart that illustrates a process for testing a new product based on enhanced calling or messaging communications based on simulated services.

FIG. 7 is a flowchart that illustrates a process 700 for testing a new product based on a simulated enhanced calling or messaging communications service. In one example, the new product is a wireless device with a changed configuration, and a test case tests performance of a sequence of network nodes. In another example, the new product is a new software program and the test case tests performance of the sequence of network nodes running the new software program. The process 700 is performed by a system communicatively coupled to a telecommunications network. In one example, the system can evaluate the new product relative to an NFV architecture for an IMS of the telecommunications network including multiple VNFs, and identify a virtual component of a VNF as a root cause of failing the test case of the new product.

At 702, the system configures a test case including a test script that validates a new product based on the enhanced calling or messaging communications service. The test script has a logic flow for communications through a sequence of network nodes over the telecommunications network. The test case includes pass/fail criteria for parameter data extracted from packets communicated between the sequence of network nodes in accordance with the logic flow.

The logic flow can include LTE/IMS registration, Wi-Fi/Wi-Fi calling, VoLTE-to-VoLTE calling, RTT-to-RTT calling, VoLTE-to-VoWiFi calling, Call Forward Unconditional procedure, Single Radio Voice Call Continuity (SRVCC) procedure, or an RCS communication. In an example, the sequence of network nodes includes a CSCF and a TAS of the IMS. As such, the system can detect anomalous activity of the IMS based on the test results and identify the CSCF or the TAS as a root source of the anomalous activity.

At 704, the system initiates an automation engine configured to execute the test script in accordance with the logic flow and validate the new product on the telecommunications network based on actual parameter data extracted from the packets relative to the pass/fail criteria. The pass/fail criteria can include mandatory and optional parameters for validating the test case, a threshold value for a tolerable difference between an actual parameter value and an expected parameter value, and a threshold time range for packets in the sequence of the of network nodes.

At 706, the system simulates the enhanced calling or messaging communications service on the telecommunications network. The simulated service is utilized by the new product. In one example, the enhanced calling or messaging communications service includes a VoLTE-to-VoLTE service, the logic flow includes a VoLTE-to-VoLTE call flow, and the new product includes a wireless device with a changed configuration. In another example, the new product includes software supported by one or more of the network nodes. In another example, the logic flow defines a call flow that traverses a sequence of VNFs of an IMS and the captured packets from different interfaces have different protocols including any of SIP, DNS, Diameter, SS7, or HTTP.

At 708, the system instantiates a network probe configured to capture the packets of the network nodes during the simulation of the enhanced calling or messaging communications service and extract the actual parameter data from the captured packets. In one example, the packets are captured at interfaces of the network nodes. In one example, the system captures different types of packets at respective interfaces of the sequence of network nodes including SIP, DNS, Diameter, SS7, or HTTP packets.

At 710, the system compares the parameter data from the captured packets to expected parameter data defined for the test case to generate test results relative to the pass/fail criteria. In one example, the system compares the parameter data to pass/fail criteria of the test case. The pass/fail criteria include mandatory and optional parameters, a threshold value for a tolerable difference between an actual and expected parameter values, and a threshold time range for a packet captured from the sequence of network nodes. The system can compare a timestamp of a captured packet to an expected time for the captured packet in accordance with the logic flow. A difference between the timestamp for the captured packet and a corresponding the expected time is compared to a pass/fail criterion to validate the new product.

At 712, the system presents an indication that the new product passed or failed the test case based on the test results. Another example of the enhanced calling or messaging communications includes an RCS service that is simulated on a telecommunications network. Examples of the RCS service includes a one-to-one chat service. The parameter data can include timestamp values for messages communicated by the RCS servers. As such, the system can configure a test case including a test script that validates a new product based on the RCS service. The test script is configured to simulate the RCS service between RCS servers for respective endpoint devices. The test case includes pass/fail criteria for parameter data associated with communications between the RCS servers.

The system initiates an automation engine configured to simulate the RCS service in accordance with the test script and instantiates a network probe configured to capture packets from the RCS servers generated during simulation of the RCS service and extract actual parameter data from the captured packets. The system compares the actual parameter data with expected parameter data to generate test data for the new product, and validates the new product based on whether the test data satisfies the pass/fail criteria.

The system can simulate communications between RCS servers in accordance with a logic flow. The logic flow defines types of packets and respective content. The new product is validated based on whether the types of packets or the content match expected types of packets or expected content. Thus, the test case can be configured to test performance of the RCS servers for a changed configuration of a wireless device or to test performance of the RCS servers running the software program.

Computer System

Figure 8:
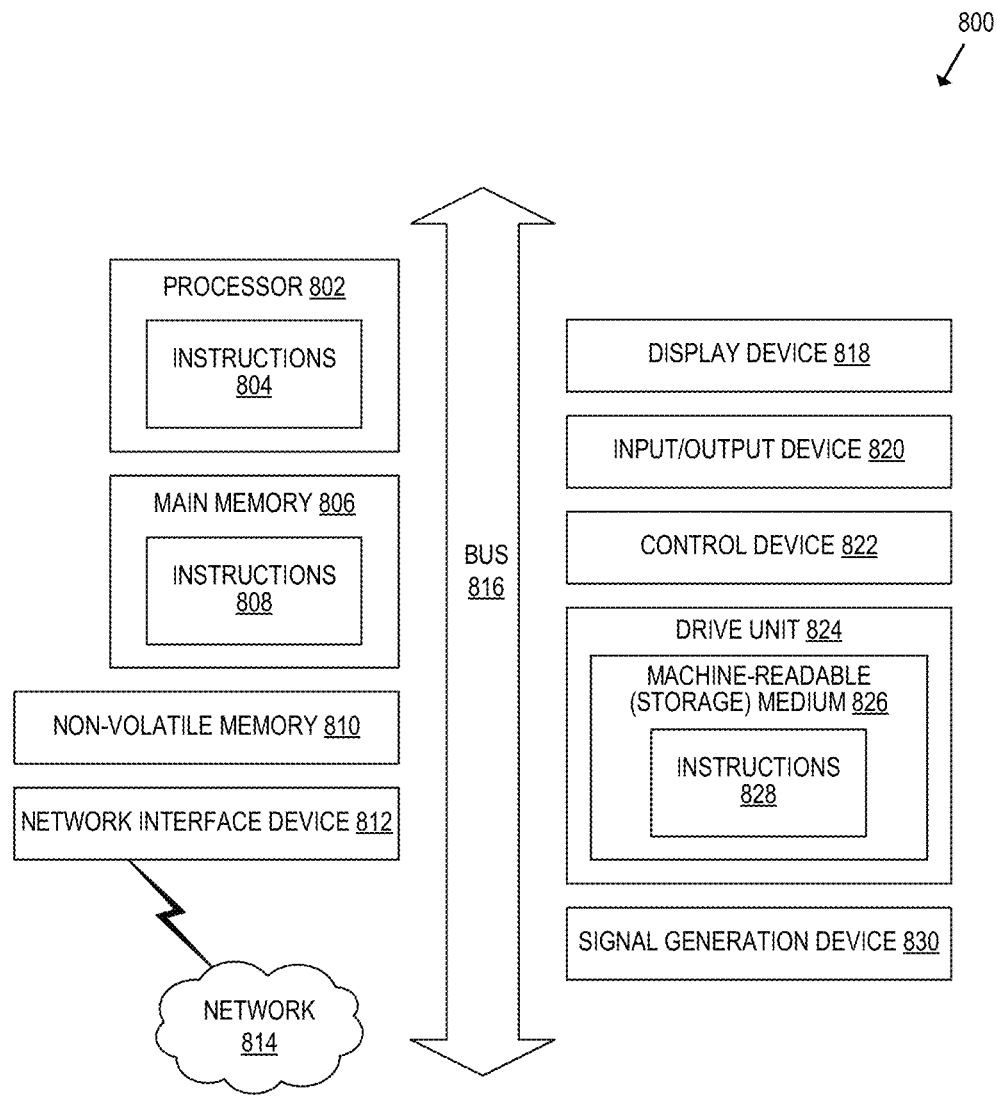
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

Related concepts are described in related applications including U.S. patent application Ser. No. 17/334,615, titled "Unified Interface and Tracing Tool for Network Function Virtualization Architecture," filed May 28, 2021 and U.S. patent application Ser. No. 17/334,640, titled "Product Validation Based on Simulated Enhanced Calling or Messaging Communications Services in Telecommunications Network," filed May 28, 2021," each of which are incorporated by reference in their entireties for all purposes.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. At least one computer-readable storage medium, excluding transitory signals and carrying instructions, which, when executed by at least one data processor of a system, cause the system to:
   instantiate a unified query tool for a telecommunications network including a Network Function Virtualization (NFV) architecture,
      wherein the NFV architecture includes distributed Virtual Network Functions (VNFs), and
      wherein each of the distributed VNFs includes multiple instances of a virtual component function;
   receive a query including key information indicative of a subscriber or a session of the telecommunications network,
      wherein the key information includes an identifier of a wireless device associated with the subscriber or the session, and
      wherein the query is associated with a logic flow that traverses a first VNF and a second VNF;
   identify a first virtual component function of the first VNF as a first anchor point for the subscriber or the session,
      wherein the first anchor point is identified based on the key information; and
   retrieve results data of the first virtual component function,
      wherein the results data satisfies the query and indicates behavior of the first virtual component function relative to the subscriber or the session.

2. The at least one computer-readable storage medium of claim 1, wherein the system is caused to, prior to receiving the query:
   instantiate a unified interface enabling access by the unified query tool to the distributed VNFs,
      wherein the unified interface is configured to receive the query as user input and output the results data in response to the query.

3. The at least one computer-readable storage medium of claim 1, wherein the logic flow traverses a third VNF, the system being further caused to:
   identify a second virtual component function of the second VNF as a second anchor point and a third virtual component function of the third VNF as a third virtual function,
      wherein each of the second anchor point and the third anchor point is identified based on the key information, and
      wherein there is only one anchor point per VNF.

4. The at least one computer-readable storage medium of claim 1, wherein the system is further caused to:
   identify a second virtual component function of the second VNF as a second anchor point for the subscriber or the session,
      wherein the second anchor point is identified based on the key information, and
   retrieve results data of the second virtual component function that also satisfies the query,
      wherein the results data indicates behavior of the second virtual component function relative to the subscriber or the session.

5. The at least one computer-readable storage medium of claim 1, wherein the logic flow models a test case on the telecommunications network for a new product, the system being further caused to:
   generate, based on the results data, test data indicative of whether the first virtual component causes an issue for the new product.

6. The at least one computer-readable storage medium of claim 1, wherein the logic flow models a test case for a new product on the telecommunications network, the system being further caused to:
   capture packets generated by the first virtual component; and
   parse the packets to extract field values,
      wherein the results data includes the extracted field values.

7. The at least one computer-readable storage medium of claim 1, wherein the logic flow models a test case for a new product on the telecommunications network, the system being further caused to:
 query log data of the first virtual component for data regarding a state of a network component, an event that occurred at a network application, or an indication of an error or warning.

8. The at least one computer-readable storage medium of claim 1, wherein the logic flow models a test case for a new product on the telecommunications network, the system being further caused to:
 retrieve, from the first virtual component, test data indicative of whether the first virtual component passed the test case,
  wherein the new product is a wireless device with a changed configuration, and
  wherein the test case is configured to test whether the first virtual component caused an issue for the wireless device with the changed configuration.

9. The at least one computer-readable storage medium of claim 1, wherein the logic flow models a test case on the telecommunications network for a new product, the system being further caused to:
 retrieve, from the first virtual component, test data indicative of whether the first virtual component passed the test case,
  wherein the new product is a software program, and
  wherein the test case is configured to test the telecommunications network running the software program.

10. The at least one computer-readable storage medium of claim 1, wherein the system is further caused to:
 capture packets generated by the first virtual component and a second virtual component of the second VNF; and
 generate the results data based on a comparison of actual parameter data extracted from the captured packets with expected parameter data.

11. The at least one computer-readable storage medium of claim 1, wherein the system is further caused to:
 capture packets generated by the first virtual component and a second virtual component of the second VNF,
  wherein the captured packets have different protocols including any of Session Initiation Protocol (SIP), Domain Name Service (DNS) protocol, Diameter protocol, Signaling System 7 (SS7) protocol, or Hypertext Transfer Protocol (HTTP); and
 generate the results data based on a comparison of actual parameter data extracted from the captured packets with expected parameter data.

12. The at least one computer-readable storage medium of claim 1, wherein the first VNF include a Call Session Control Function (CSCF) and the second VNF includes a Telephony Application Server (TAS) of an IP Multimedia Subsystem (IMS).

13. The at least one computer-readable storage medium of claim 1, wherein the logic flow models an LTE/IMS registration, Wi-Fi/Wi-Fi calling, VoLTE-to-VoLTE calling, RTT-to-RTT calling, VoLTE-to-VoWiFi calling, Call Forward Unconditional procedure, Single Radio Voice Call Continuity (SRVCC) procedure, or an RCS communication.

14. A system comprising:
 at least one hardware processor; and
 at least one non-transitory memory storing instructions, which, when executed by the at least one hardware processor, cause the system to:
  receive a query including key information indicative of a subscriber,
   wherein the key information includes an identifier of a wireless device or a session of a telecommunications network;
  simultaneously send copies of the query to multiple Virtual Network Functions (VNFs) of the telecommunications network,
   wherein each of the multiple VNFs includes a set of virtual component functions, and
   wherein a logic flow traverses the multiple VNFs;
  identify a virtual component for each of the multiple VNFs as an anchor point for the logic flow,
   wherein each anchor point is identified based on the key information; and
  retrieve results data from the multiple VNFs,
   wherein the results data satisfies the query and indicates a particular virtual component as a root cause of an issue.

15. The system of claim 14, wherein the logical flow defines a sequence for the multiple VNFs, the system being further caused to:
 generate a report including the results data retrieved from each of the sequence of multiple VNFs.

16. The system of claim 14 further caused to, prior to identifying the root cause of the issue:
 trace log data regarding a state of a network component, an event that occurred at a network application, or an indication of an error or warning, wherein the issue is identified based on the log data.

17. The system of claim 14 further caused to:
 generate a common file including the results data obtained from the multiple VNFs; and
 cause a unified interface to access the common file and present the results data.

18. A method for simultaneously querying multiple of a telecommunications network, the method comprising:
 instantiating a unified query tool configured to query a distributed network of virtual functions of a telecommunications network,
  wherein each virtual function includes a set of virtual component functions;
 receiving user input including a query with key information associated with a wireless device,
  wherein the key information identifies a subscriber account associated with the wireless device or identifies a session on the telecommunications network;
 identifying a particular virtual component function among a particular set of virtual component functions of a particular virtual function as a connection point for the wireless device on the telecommunications network; and
 retrieving results data of the particular virtual component function,
  wherein the results data satisfies the query and indicates behavior of the particular virtual component function relative to the subscriber or the session.

19. The method of claim 18, wherein the query is associated with a logic flow that traverse a sequence of the virtual network functions, wherein the query is sent to each of the sequence of the virtual network functions, and wherein identifying the particular virtual component function comprises:
 matching the key information with data associated with the particular virtual component function.

20. The method of claim 18, wherein the query is associated with a logic flow for simulating an enhanced calling or messaging communications service on the telecommunications network.

* * * * *